April 28, 1936.  A. E. SIMONSON  2,038,611
BORING BAR
Filed April 19, 1934
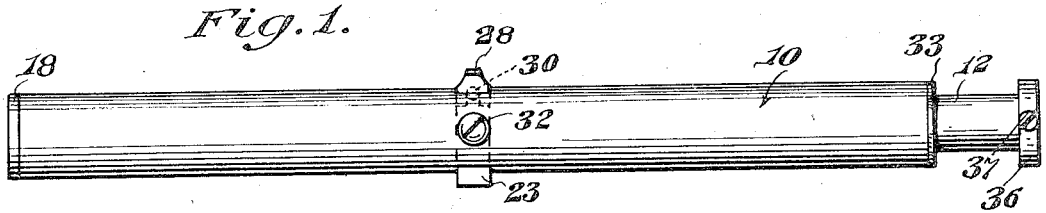
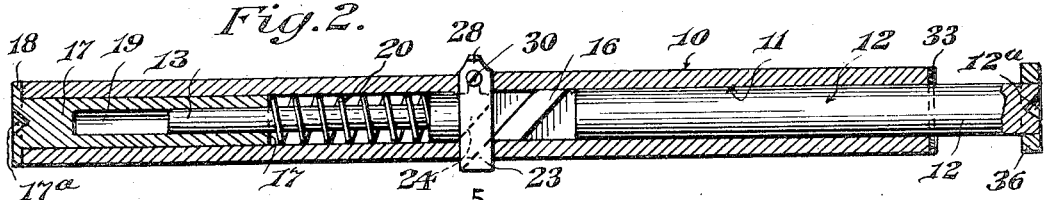
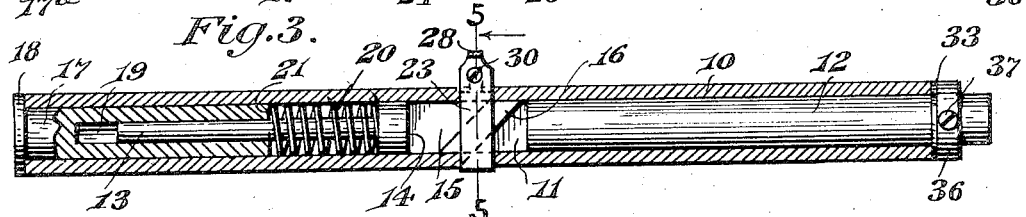
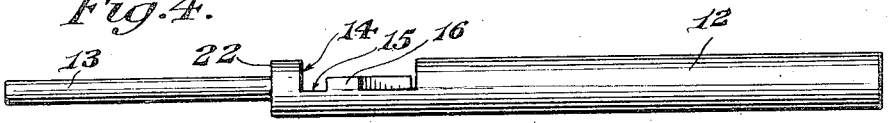
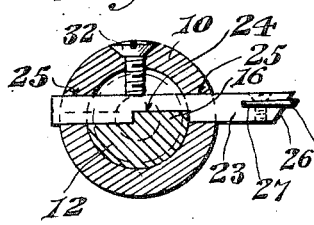
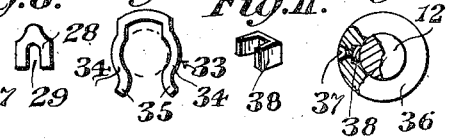
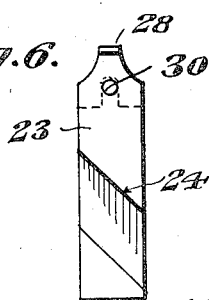
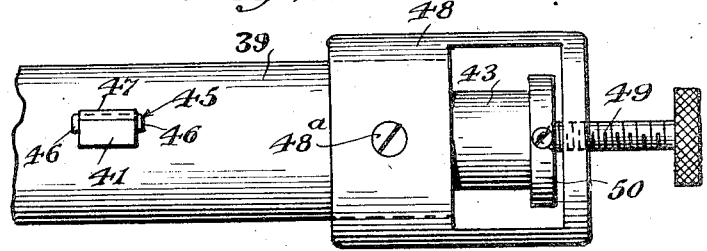
Inventor
Alvin E. Simonson,
By Irving L. McCathran
Attorney Patented Apr. 28, 1936

2,038,611

UNITED STATES PATENT OFFICE 2,038,611

BORING BAR

Alvin E. Simonson, Kismet, Kans.

Application April 19, 1934, Serial No. 721,396

1 Claim. (Cl. 77—56)

This invention relates to boring bars and more particularly to that type of boring bar which may be used conveniently upon a lathe or other machines, such as bearing machines, and the like.

Another object of this invention is the production of a simple and efficient boring bar, the cutting tool of which may be projected or adjusted by advancing or retracting the tail stock center of a lathe upon which the boring bar is used.

A further object of this invention is the production of a simple and efficient boring bar, the cutting tool of which may be quickly set to a properly adjusted position merely through a proper adjustment of the tail stock of the lathe.

A still further object of the invention is the production of a simple and efficient means for limiting the adjustment of the cutting tool, thereby permitting the operator to readily ascertain the maxium depth of the cut made by the cutting tool.

Other objects and advantages of the present invention will appear throughout the following specification and claim.

In the drawing:

Figure 1 is a top plan view of the boring bar;

Figure 2 is a longitudinal sectional view through the boring bar showing the parts in an extended position;

Figure 3 is a similar sectional view to that shown in Figure 2, the parts being in a compressed position;

Figure 4 is a side elevation of the main plunger which is adapted to adjust the cutting tool;

Figure 5 is an enlarged transverse sectional view taken on line 5—5 of Figure 3;

Figure 6 is a bottom plan view of the cutting tool;

Figure 7 is a side elevation of the cutting tool showing the cutting bit removed and a portion of the tool being shown in section;

Figure 8 is a top plan view of one type of cutting bit used in connection with the present invention;

Figure 9 is a side elevation of the spring snap or clip used in conjunction with the main plunger to permit the operator to properly gage the depth of the cut of the cutting tool;

Figure 10 is an end elevation of the boring bar, a certain portion being shown in section and illustrating the manner of locking the stop collar upon the main plunger;

Figure 11 is a detail perspective view of the clamping shoe used in connection with the stop collar;

Figure 12 is a top plan view of a portion of the rear end of the boring bar shown in conjunction with a suitable casting which may be used in place of the conventional tail stock;

Figure 13 is a transverse sectional view through the boring bar showing a modified form of holder for the cutting tool; and Figure 14 is a detail perspective view of the track plate carried by the boring bar and constituting a track guide for the cutting tool.

By referring to the drawing, it will be seen that 10 designates the shell or casing which preferably comprises an elongated tubular body having a central longitudinally extending bore 11. Within one end of this longitudinally extending bore 11 is slidably mounted the main plunger, which main plunger 12 is provided with a reduced extension 13 at its inner end as clearly shown in Figures 2 and 4 of the drawing.

This main plunger 12 is provided with a cutout socket portion 14 near its inner end and adjacent the reduced extension 13 which cutout socket portion 14 is provided with a flat bottom 15 having an upwardly extending tongue 16 which tongue 16 extends at a radical angle across the flat face 15 of the socket 14, the tongue or rib 16 preferably extending at an angle of approximately forty-five degrees. This angle, however, may be varied to suit the convenience of the operator or manufacturer without departing from the spirit of the invention.

A tubular plug 17 is fitted in the end of the shell or casing 10 opposite to the main plunger 12 and carries a head portion 18 which fits against the end of the shell or casing 10, as shown in Figure 3, to limit the inward movement of the plug 17 within the shell or casing 10. This plug 17 is provided with a socket 19 in which the reduced extension 13 of the main plunger 12 is slidably mounted. A coil spring 20 is mounted upon the reduced extension 13 and is interposed between the inner end 21 of the plug 17 and the shoulder 22 which is formed at the junction of the reduced extension 13 with the body portion of the main plunger 12. This spring 20 is adapted to normally urge the main plunger 12 outwardly with respect to the shell or casing 10 as will be obvious.

The cutting tail comprises a tool block 23 which is of an elongated relatively narrow construction, which tool block is provided with a diagonally formed groove or channel 24 in the under face thereof, the groove or channel 24 being adapted to be engaged by the diagonally extending rib 16 of the main plunger 12 when this plunger 12 is moved longitudinally of the shell or casing 10 for the purpose of moving the tool block 23 transversely of the casing 10 or to or from an extended position. This tool block 23 extends transversely of the casing 10 and projects through the transverse apertures 25 formed in the side walls of the casing or shell 10. It will therefore be seen that as the main plunger 12 is moved inwardly within the shell or casing 10, the inclined rib 16 will fit within the inclined groove 24 of the tool block 23 and move the cutting end 26 of the tool block 23 outwardly to the desired adjusted cutting position. The outer end 26 of the tool block 23 is provided with a bifurcated or notched portion 27 into which is fitted the cutting bit 28 which may be of any suitable or desired design. The bit 28 is preferably bifurcated, as at 29, the bifurcated portion 29 being adapted to fit around a suitable clamping screw 30, which screw 30 fits within the socket 31 for firmly clamping the bit 28 in a set position. It should be understood that the bit 28 may be removed and replaced by a different type of bit without departing from the spirit of the invention, and that tool blocks of different lengths may be employed, one to be substituted for the other depending upon the size of the cut to be made. Only one type of tool block 23 is, however, illustrated. Different lengths of tool blocks may be employed without departing from the spirit of the invention.

Should it be so desired, a locking screw 32 may be carried by the casing or shell 10 for binding engagement with the tool block 23 for locking the tool block in a set position and eliminating the adjustable feature of the tool. Ordinarily, however, the clamping screw 32 may be loosened or removed if desired, to permit of the proper adjustment of the tool block 23 by the proper longitudinal movement.

In order to properly gage the depth of the cutting tool, I provide a spring steel snap or clip 33 which is adapted to slip over the main plunger 12, as shown in Figures 1 to 3, inclusive, the detail structure of this snap or clip being shown in Figure 9. This snap or clip 33 is preferably U-shaped in formation, having spring arms 34 which terminate in outwardly bent ends 35 to facilitate the slipping of the clip over the main plunger 12. This snap or clip is used as a spacer to identify one of the different positions of the cutter. A stop collar 36 is slidably mounted upon the main plunger 12 and is held in a set or adjusted position by means of a clamping screw 37, the clamping screw 37 engaging a substantially U-shaped clamping shoe 38 which is carried by the collar 36 to provide a wide gripping face upon the main plunger 12 and prevent the injury of the plunger when forcing the screw 37 into a clamping position.

In Figures 12 and 13 there is shown a modified form of the invention wherein the main casing 39 is provided with transversely extending openings 40 through which the tool block 41 extends, the tool block carrying the usual bit 42. The main adjustable plunger 43 is similarly constructed to the plunger 12 and the tool block 41 is actuated by means of a diagonally extending rib 44 similar to the rib or tongue 16, previously described. The only difference in this modified form from that originally described, is the trackway 45 which is carried by the shell or casing 39, this trackway 45 being substantially U-shaped in cross-section having side flanges 46 and within which the tool block 41 is adapted to slide. The ends 47 of the plate 45 are turned upwardly, as shown in Figure 13 after the plate is placed in position to hold this plate 45 against movement. As shown in Figure 12, the shell or casing 39 may, if it is desired, be supported upon a suitable casting 48, which casting carries an adjusting screw 49 for engaging the outer end 50 of the main plunger 43. This casting structure is employed when the device is used without the usual tail stock, and when this particular type of device is used it is preferred to make the adjustment after the boring tool has ceased to rotate or turn. The shell 39 may be locked in engagement with the casting 48 by means of a locking screw 48a.

As shown in Figure 2, the plug 17 is provided with a centering recess 17a at its outer end for receiving the bearing of the head stock. The main plunger 12 is provided with a centering recess 12a for receiving the bearing of the tail stock.

It should be understood that the present invention relates to the boring tool and not to the particular type of support such as the particular type of head or tail stock ordinarily employed upon a lathe or similar machine. However, the resilient mounting of the main plunger 12, as previously described, will permit of the adjustment of the cutting tool even while the machine is in operation.

In making the limit of adjustment of the cutting tool, the operation of the device is as follows:—First, determine the size of the bore to be made, place the bar on the centers of the head and tail stock, then place the snap or clamp 33 on the plunger 12, as shown in Figures 1 and 2. The tail stock is then tightened or brought to the tail stock center 12a and the tail stock is moved further until the point of cutting tool is projected to bore the diameter desired. Now, by using a micrometer or the calipers to determine the diameter, the screw 37 is loosened and the collar 36 is brought to bear against the spring snap or clip 33. The screw 37 is then tightened to lock the collar 36 in the proper position. The tail stock center is then loosened slightly and the first or rough cut is then taken. The tail stock is again loosened further, and the carriage is run back for another start. Of course, the work is to be clamped in the usual jig on the carriage. The tail stock is then brought forward until the stop collar 36 abuts against the snap or clip 33 and the finished work may then be taken out of the bore. The screw 32 may then be locked, if desired, or if necessary to hold the cutting tool in a set position to make it more rigid. If the oil groove is to be cut it is preferable to loosen the tail stock slightly. The snap or clip 33 may be removed from the bar and the bar may again be rotated if it has been stopped. The position of the groove should then be found, and the tail stock is brought forward slowly until the stop collar 36 abuts against the end of the shell or casing 10 and the groove is cut as deep as the snap or clip 33 is wide. This particular device will apply on a machine having means for shifting carriage equipment to cut spiral grooves, and cuts a fine smooth groove because the tool may be fed into the work while it is still rotating and the stock does not need to be removed from the groove at one revolution which would put undue strain on the work and bar. The same process may be repeated any number of times without the necessity of further measurements or changing after the device has been properly set, as above. The only thing removed from the bar is the snap gage or clip 33, and when this snap or clip 33 is replaced and the bar replaced against the stop collar, the periphery of the cutter is uniformly the same.

In both Figures 5 and 13, it should be noted that the cutting tool is mounted transversely through the casing or shell 10 slightly above the center in order to provide a greater bearing surface for the cutting tool.

It should be understood that certain detail changes in the mechanical construction, combination or arrangement of parts may be employed, without departing from the spirit of the invention, so long as such changes fall within the scope of the appended claim.

Having described the invention, what I claim as new is:—

A boring bar especially constructed for adjustment through the medium of the tail stock of a lathe or similar machine comprising an elongated tubular shell, a cutting blade radially adjustable in said shell, a plug closing one end of said shell and having a socket, a main plunger slidably mounted within said shell and having a reduced extension slidably mounted in said socket, a coil spring engaging one end of said plunger and the inner end of said plug for forcing the main plunger outwardly of the shell, said spring being carried by said reduced extension, said main plunger and cutting blade having a longitudinally inclined inter-engaging rib and groove connection for radially adjusting said blade by the longitudinal movement of said main plunger, said main plunger having a portion projecting from one end of said shell, and said projecting portion being provided with a centering recess engageable by a tail stock to center the boring bar and longitudinally adjust said plunger to feed said cutting blade radially while the boring bar is rotated.

ALVIN E. SIMONSON.